United States Patent
Hiramoto et al.

(10) Patent No.: US 9,690,130 B2
(45) Date of Patent: Jun. 27, 2017

(54) DISPLAY DEVICE

(71) Applicant: Japan Display Inc., Minato-ku (JP)

(72) Inventors: Koji Hiramoto, Minato-ku (JP);
Toshimitsu Yoshifuku, Minato-ku (JP);
Yoshihisa Watanabe, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/697,781

(22) Filed: Apr. 28, 2015

(65) Prior Publication Data

US 2015/0323822 A1    Nov. 12, 2015

(30) Foreign Application Priority Data

May 9, 2014    (JP) .................................. 2014-097505

(51) Int. Cl.
*G02F 1/1339*    (2006.01)
*G02F 1/1333*    (2006.01)

(52) U.S. Cl.
CPC ........ *G02F 1/13338* (2013.01); *G02F 1/1339* (2013.01); *G02F 2202/28* (2013.01)

(58) Field of Classification Search
CPC ............... G02F 1/13338; G02F 1/1339; G02F 2202/28; G02F 2001/133331
See application file for complete search history.

(56) References Cited

U.S. PATENT DOCUMENTS

| 2005/0092927 A1* | 5/2005 | Nagano .................. G01T 1/2928 250/370.11 |
| 2007/0262700 A1* | 11/2007 | Satomi .................... H05B 33/22 313/498 |
| 2009/0185100 A1* | 7/2009 | Matsuhira .............. G02B 6/005 349/58 |
| 2011/0199348 A1* | 8/2011 | Takatani ............. G02F 1/13452 345/204 |

FOREIGN PATENT DOCUMENTS

JP    2013-250304    12/2013

* cited by examiner

*Primary Examiner* — Nathanael R Briggs
(74) *Attorney, Agent, or Firm* — Oblon, McClelland, Maier & Neustadt, L.L.P.

(57) ABSTRACT

According to one embodiment, provided is a display device with an improved manufacturability which is capable of preventing a decrease in the display quality due to a change in the gap between an array substrate and a counter substrate caused by a temperature change. The primary bonding portion is composed of translucent synthetic resin and provided to bond together the counter substrate side and a touch panel side in a manner covering at least a display area. The secondary bonding portion is provided in a columnar shape through curing of adhesive being ultraviolet curable liquid resin with a viscosity higher than that of the synthetic resin of the primary bonding portion, the secondary bonding portion bonding together the non-opposed portion side and the touch panel side.

5 Claims, 4 Drawing Sheets

DISPLAY DEVICE

INCORPORATION BY REFERENCE

The present invention claims priority under 35 U.S.C. §119 to Japanese Patent Application No. 2014-097505 filed on May 9, 2014. The content of the application is incorporated herein by reference in its entirety.

FIELD

An embodiment of the present invention relates to a display device in which a display device main body and a touch panel are bonded together via a bonding portion.

BACKGROUND

Conventionally, liquid crystal display devices (LCDs) with a touch panel for use in multifunctional mobile terminals such as smartphones have a structure in which the touch panel is bonded via a bonding portion to the liquid crystal panel, that is, the display device main body of the liquid crystal display device.

Such a bonding portion is known to employ a so-called lamination method in which translucent ultraviolet (UV) curable resin, for example, is used to bond together the liquid crystal panel and the touch panel across the whole surfaces thereof. The lamination method is often employed particularly for high-performance devices because no air layer exists between the liquid crystal panel and the touch panel so that the visibility does not decrease due to reflection generated at the interfaces of such an air layer.

Meanwhile, in the liquid crystal panel, an array substrate with an array of thin-film transistors (TFTs) formed thereon and a counter substrate are disposed in a manner opposed to each other and a driver IC is commonly mounted in the vicinity of an end portion of the array substrate extending outward from an end portion of the counter substrate. Accordingly, when the touch panel is bonded to the counter substrate side, which is positioned on the display side of the liquid crystal panel, a gap is formed between the touch panel and the site of the driver IC on the end portion of the array substrate extending from the end portion of the counter substrate. A force applied from the back side of the gap would cause the end portion of the array substrate protruding from the end portion of the counter substrate to undergo a deflection, resulting in a change in the gap between the array substrate and the counter substrate and therefore a yellow unevenness (yellowing unevenness) within the display area.

Hence, in order to fill such a gap, spacer tape is respectively bonded to the periphery of the driver IC on the array substrate and the touch panel to reduce the clearance difference between the array substrate and the touch panel and, into the remaining portion of the gap that cannot be filled with the spacer tape, low-viscosity UV curable resin or silicon, for example, is casted to completely fill the gap.

In the case of filling the remaining portion of the gap with low-viscosity UV curable resin, however, the portion, if it has a large thickness, is thermally stable but insufficient in stiffness, and thus the yellowing unevenness is still likely to occur. Also, in the case of stretching the UV curable resin used to fill the gap within the display area to the periphery of the driver IC, it is not easy to adjust the amount and position of application of the resin. Further, the portion of the gap that cannot be filled with the spacer tape has a three-dimensional extension and it is therefore necessary to adjust the amount of UV curable resin such that the gap is filled while predicting the flow-in of the UV curable resin into the extension, which makes it difficult to control the resin amount.

On the other hand, in the case of filling the remaining portion of the gap with silicon, stiffness can be ensured and thereby yellowing unevenness at room temperature can be reduced but, at an increased temperature, yellowing unevenness due to thermal expansion will occur. In addition, applying and drying silicon takes man-hours longer than using UV curable resin, resulting in poor manufacturability.

DETAILED DESCRIPTION

Embodiments provide a display device including a display device main body capable of displaying an image thereon, a touch panel transparent to display on the display device main body, and a bonding portion bonding the display device main body and the touch panel to each other. The display device main body includes a first substrate, a second substrate, and a peripheral portion. The second substrate is disposed with a predetermined clearance maintained with respect to the first substrate in a manner opposed to a portion of the first substrate. The second substrate is also arranged to form with the first substrate a display area therebetween capable of displaying an image therein. The peripheral portion is provided at a position of the first substrate not opposed to the second substrate. The bonding portion includes a primary bonding portion and a secondary bonding portion. The primary bonding portion is composed of translucent synthetic resin and provided to bond together the second substrate side and the touch panel side in a manner covering at least the display area. The secondary bonding portion is provided in a columnar shape through curing of adhesive being ultraviolet curable liquid resin with a viscosity higher than that of the synthetic resin of the primary bonding portion, the secondary bonding portion bonding together the peripheral portion side and the touch panel side.

A configuration according to a first embodiment will hereinafter be described with reference to FIGS. 1 to 3.

Figure 1:
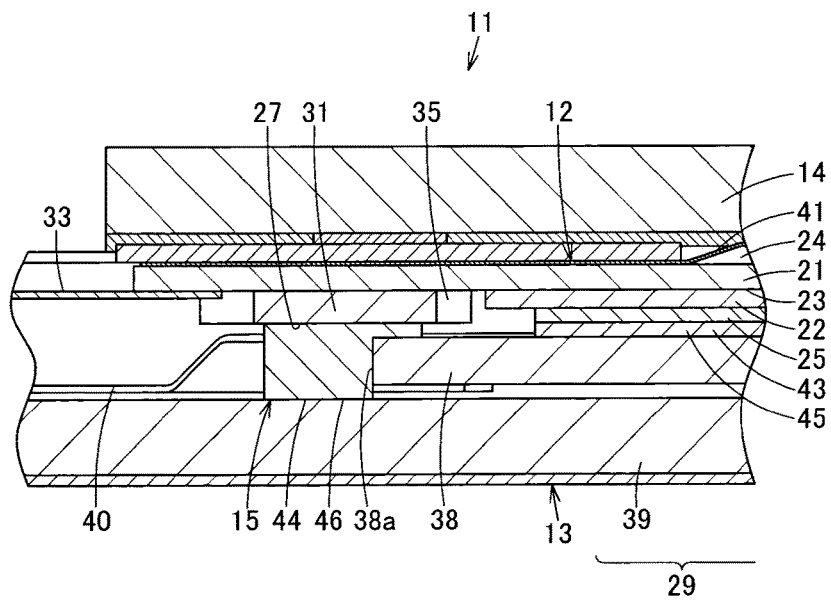
FIG. 1 is a cross-sectional view showing a portion of a display device according to a first embodiment.
Figure 2:
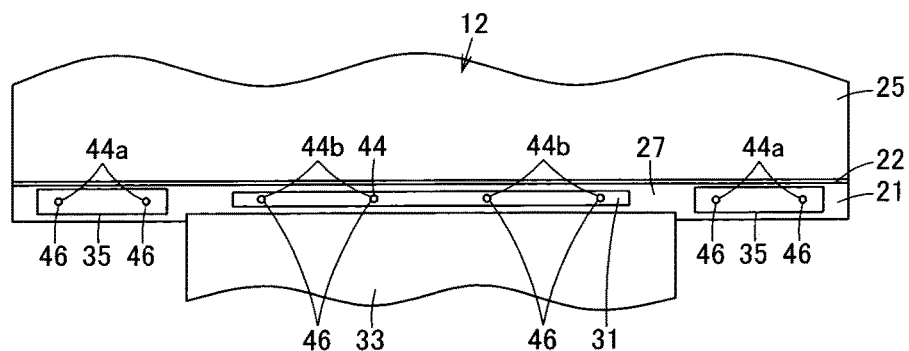
FIG. 2 is a plan view schematically showing an application pattern of adhesive forming a secondary bonding portion of the display device.
Figure 3:
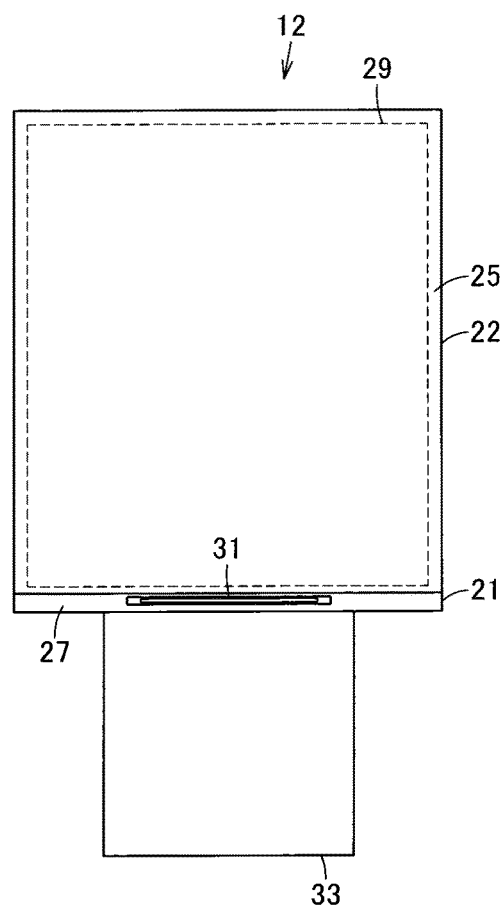
FIG. 3 is a plan view schematically showing a display device main body of the display device.

In FIGS. 1 to 3, the reference numeral 11 denotes a display device (flat panel display (FPD)), and the display device 11 is a liquid crystal display device to be installed in various multifunctional mobile terminals such as smartphones and mobile PCs.

The display device 11 then includes a liquid crystal panel 12 serving as a display device main body, a touch panel 13 covering the liquid crystal panel 12, a backlight 14, and a bonding portion 15 bonding together the liquid crystal panel 12 and the touch panel 13.

The liquid crystal panel 12 is, for example, an active matrix type liquid crystal panel module including a quadrilateral array substrate 21 serving as a first substrate, a quadrilateral counter substrate 22 serving as a second substrate disposed in a manner opposed to the array substrate 21 with a predetermined clearance therebetween, a liquid crystal layer 23 serving as an optical modulation layer provided between the substrates 21 and 22, and polarizing plates 24 and 25 bonded to the respective substrates 21 and 22. The liquid crystal panel 12 may be a reflective or semi-transmissive type one, though described as, for example, a transmissive type one in this embodiment.

The array substrate 21 and the counter substrate 22 are each formed in a thin flat plate shape (in a flat manner) by forming a predetermined functional layer on a translucent insulating substrate such as a glass substrate. Also, the counter substrate 22 has a width dimension approximately equal to that of the array substrate 21 and a longitudinal dimension smaller than that of the array substrate 21. That is, the counter substrate 22 has an area smaller than that of the array substrate 21.

The liquid crystal panel 12 is formed by bonding together peripheral edge portions of the array substrate 21 and the counter substrate 22 with a sealing member not shown with one longitudinal end side of the array substrate 21 being aligned with one longitudinal end side of the counter substrate 22. Accordingly, the array substrate 21 has a non-opposed portion 27 serving as a peripheral portion not opposed to the counter substrate 22 and extending outside of the position on the other longitudinal end side of the counter substrate 22. That is, in the liquid crystal panel 12, the position of the non-opposed portion 27 is recessed relative to the surface position of the counter substrate 22 (and the polarizing plate 25) and discontinued flatness is caused due to the non-opposed portion 27. In other words, the thickness of the liquid crystal panel 12 changes stepwise to be discontinued into the position of the non-opposed portion 27. In the thus arranged liquid crystal panel 12, the quadrilateral area surrounded by the sealing member used for bonding of the array substrate 21 and the counter substrate 22 is filled with the liquid crystal layer 23 and formed with a matrix of multiple pixels not shown to define a display area 29.

The display area 29 is entirely covered with, for example, the polarizing plate 25 attached to the counter substrate 22. Also, respective pixels positioned within the display area 29 are electrically connected to a driver 31, an IC serving as a functional member mounted on the array substrate 21 using, for example, an anisotropic conductive film (ACF) with respect to a terminal pad provided in the non-opposed portion 27 and arranged to be driven by the driver 31. The driver 31 has a thickness of, for example, about 200 μm to 300 μm, being longitudinal along the width direction (lateral direction) of the non-opposed portion 27 (the array substrate 21) and approximately coplanar with the surface (on the display side surface) of the counter substrate 22 including the polarizing plate 25. The driver 31 is also electrically connected with an external circuit through a flexible printed circuit-board (FPC) 33, a connecting member serving as a functional member electrically connected to the array substrate 21 using, for example, an anisotropic conductive film not shown at the terminal pad provided in the non-opposed portion 27 to be controlled by the external circuit. The flexible printed circuit-board 33 is formed by mounting an element not shown on a flexible film-like insulating substrate thinner than the array substrate 21, the counter substrate 22, and the driver 31.

The liquid crystal panel 12 can then display, for example, an image in the display area 29 by driving the pixels with the driver 31 controlled by the external circuit to cause the pixels to have their respective varied incident light transmission rates. The liquid crystal panel 12 further includes a spacer 35 serving as a thickness difference adjusting member disposed at a position of the non-opposed portion 27 of the array substrate 21 excluding the driver 31 and the flexible printed circuit-board 33. The spacer 35 is composed of resin such as PET and formed in an elongated film shape having a thickness approximately equal to that of the driver 31 and, in the non-opposed portion 27, bonded at a position excluding the driver 31 and the flexible printed circuit-board 33, for example, at each of the longitudinal ends of the driver 31 in a manner away from the driver 31. As a result, each spacer is longitudinal along the width direction (lateral direction) of the non-opposed portion 27 (the array substrate 21), and the surface of each spacer 35 is approximately coplanar with the surface (on the display side surface) of the counter substrate 22 including the polarizing plate 25.

The touch panel 13 is a capacitance type sensor arranged to detect a touch and its position of, for example, a user's finger or a pointer such as an input pen by sensing a change in the capacitance when the fingertip or the like comes close thereto or comes into contact therewith, the touch panel 13 including a sensor portion 38 serving as a touch panel main body and a protector cover 39 serving as a protective member covering the sensor portion 38. The touch panel 13 is then formed to have translucency so as to be transparent to an image displayed in the display area 29 of the liquid crystal panel 12.

The sensor portion 38 is film-formed by forming a lower layer transparent conductive film, an oxide film, an upper layer transparent conductive film, a protective film, and the like on a translucent insulating substrate such as a glass substrate. Further, the sensor portion 38 is formed to have the same size and shape (quadrilateral) as that of the liquid crystal panel 12 (the array substrate 21 of the liquid crystal panel 12) in a plan view and, for example, bonded to the liquid crystal panel 12 via the bonding portion 15 with one end side being aligned with the liquid crystal panel 12. The sensor portion 38 is also electrically connected with a flexible printed circuit-board (FPC) 40 by the insulating substrate and, by the flexible printed circuit-board 40, electrically connected with an external circuit so that the operation is controlled by the external circuit.

The protector cover 39 is provided to protect the sensor portion 38 and the liquid crystal panel 12 against scratches and the like, and formed of, for example, translucent glass or synthetic resin in a quadrilateral flat plate shape. Further, the protector cover 39 has, for example, a quadrilateral shape with a longitudinal dimension larger than that of the sensor portion 38 and the liquid crystal panel 12, and is bonded to the surface side of the sensor portion 38 with one end side being aligned with the sensor portion 38 and the liquid crystal panel 12 and the other end side extending in a manner overhanging and covering the other end side of the array substrate 21. It is noted that the protector cover 39 may be printed with something appropriate for a design improvement.

The backlight 14 is positioned in a manner opposed to the polarizing plate 24 side on the array substrate 21 and formed in a quadrilateral flat plate shape to provide planar light to the display area 29 of the liquid crystal panel 12. The backlight 14 is electrically connected with a flexible printed circuit-board (FPC) 41 and, by the flexible printed circuit-board 41, electrically connected with an external circuit so that the operation is controlled by the external circuit.

The bonding portion 15 includes a primary bonding portion 43 positioned on the counter substrate 22 and a secondary bonding portion 44 positioned in the non-opposed portion 27.

The primary bonding portion 43 is a planar portion formed in a quadrilateral shape in a plan view covering the display area 29 and, in this embodiment, the entire polarizing plate 25 of the counter substrate 22 to bond together the liquid crystal panel 12 and the touch panel 13 side (the sensor portion 38) at the position of the polarizing plate 25. That is, the primary bonding portion 43 is formed to expand into a plane. The translucent synthetic resin 45 forming the primary bonding portion 43 is composed of a material such as translucent acrylic ultraviolet (UV) curable resin that optically matches the counter substrate 22 side (the polarizing plate 25) and the sensor portion 38 of the touch panel 13 side to reduce interface reflection, and has a viscosity lower than that of adhesive 46 forming the secondary bonding portion 44 so as to flow and expand in an applied state.

The secondary bonding portion 44 is a columnar portion bonding the non-opposed portion 27 side of the liquid crystal panel 12 and the touch panel 13 side (the sensor portion 38 and the protector cover 39). The secondary bonding portion 44 is positioned only in a part of the non-opposed portion 27 in a manner away from the primary bonding portion 43. In this embodiment, the secondary bonding portion 44 is formed in points (e.g. circular in a plan view) disposed at multiple sites along the lateral direction of the non-opposed portion 27 in a manner spaced approximately equally from each other. Specifically, the secondary bonding portion 44 of this embodiment includes multiple first secondary bonding portions 44a positioned on the spacer 35 in the non-opposed portion and multiple second secondary bonding portions 44b positioned on the driver 31 in the non-opposed portion 27. In this embodiment, the secondary bonding portion 44 then bonds together the non-opposed portion 27 side (the spacer 35 part and the driver 31 part) and the other end portion of the sensor portion 38 as well as the part from the other end face 38a to the protector cover 39 stepwise. That is, the secondary bonding portion 44 has an L shape in a cross-sectional view. It is noted that each secondary bonding portion 44 desirably has a ratio ((diameter)/(gap)) of a predetermined value or less (e.g. 15 or less) between the diameter in a plan view and the gap between the non-opposed portion 27 side (the spacer 35 part and the driver 31 part) and the touch panel 13 side (the sensor portion 38 and the protector cover 39) at the position of the secondary bonding portion 44. In this embodiment, since the gap between the non-opposed portion 27 side (the spacer 35 part and the driver 31 part), on which the secondary bonding portion 44 is provided, and the touch panel 13 side (the sensor portion 38) is set to, for example, about 100 μm (0.1 mm), the secondary bonding portion 44 desirably has a diameter of 1.5 mm or less, respectively.

The adhesive 46 forming the secondary bonding portion 44 is so-called plastic fluid composed of a material such as translucent acrylic UV curable resin and formed to have high viscosity so that it cannot flow in an applied state to maintain approximately the original shape but can flow when applied with an external force of a predetermined magnitude or more.

Next will be described an assembling procedure according to the first embodiment above.

Through appropriate film forming and etching, for example, an array substrate 21 and a counter substrate 22 are first formed on an insulating substrate. Next, the substrates 21 and 22 are bonded together with a liquid crystal material forming a liquid crystal layer 23 and therefore a predetermined clearance therebetween or bonded together with a predetermined clearance therebetween, which thereafter is filled (by dropping) with a liquid crystal material forming a liquid crystal layer 23. Further, in a non-opposed portion 27 of the array substrate 21, a driver 31 and a flexible printed circuit-board 33 are mounted on a terminal pad through thermocompression bonding using an anisotropic conductive film. As a result, the driver 31 and the flexible printed circuit-board 33 are electrically connected to pixels within the display area 29. Subsequently, spacers 35 are bonded to the non-opposed portion 27, respectively. Polarizing plates 24 and 25 are then bonded to the substrates 21 and 22 to complete a liquid crystal panel 12.

On the other hand, a lower layer transparent conductive film, an oxide film, an upper layer transparent conductive film, a protective film, and the like are film-formed appropriately on an insulating substrate, on which a flexible printed circuit-board 40 is mounted through thermocompression bonding using an anisotropic conductive film to form a sensor portion 38. A protector cover 39 is then bonded in a manner covering the sensor portion 38 to complete a touch panel 13.

Liquid synthetic resin 45 is then applied on the counter substrate 22 (the polarizing plate 25) of the thus completed liquid crystal panel 12, and adhesive 46 being UV curable resin with a viscosity higher than that of the synthetic resin 45 is respectively applied at multiple sites in points on the spacer 35 and the driver 31 at multiple sites in the non-opposed portion 27, on which the thus completed touch panel 13 is aligned and laid to stick thereto. At this time, the synthetic resin 45 with lower viscosity expands into a plane on the counter substrate 22 (the polarizing plate 25), while the adhesive 46 with higher viscosity expands slightly with pressing of the liquid crystal panel 12 and the touch panel 13 against each other while remaining approximately in the shape of points, and sticks to the touch panel 13 through deformation following, for example, the step between the non-opposed portion 27 side and the touch panel 13 side. The synthetic resin 45 and the adhesive 46 are then, respectively, caused to cure through exposure to ultraviolet radiation thereon to form a primary bonding portion 43 and secondary bonding portions 44. That is, the position of the counter substrate 22 side of the liquid crystal panel 12 and the position of the non-opposed portion 27 of the liquid crystal panel 12 are bonded to the touch panel 13 side, respectively, via the planar primary bonding portion 43 and the multiple columnar secondary bonding portions 44. Thereafter, a backlight 14 is disposed and the assembly is housed in a case body not shown to complete a display device 11.

Since the secondary bonding portions 44 are thus formed through curing of the adhesive 46 applied in points, using the adhesive 46 even at a smaller amount can effectively bond together the non-opposed portion 27 side and the touch panel 13 side.

In addition, the secondary bonding portions 44 are set in points away from each other and, even if the secondary bonding portions 44 may thermally expand under high temperature, for example, can expand into a sufficiently ensured horizontal space, so that the gap between the substrates 21 and 22 is less likely to change and yellow unevenness (yellowing unevenness) due to such a change would be less likely to occur within the display area 29, whereby it is possible to prevent the display quality from decreasing.

Further, since the secondary bonding portions 44 are disposed in points on the driver 31 and the spacer 35, which has approximately the same thickness as that of the driver 31, respectively, all the secondary bonding portions 44 can have approximately the same size, so that the amount of application of the adhesive 46 can be controlled more easily, resulting in a manufacturability improvement.

Figure 4:
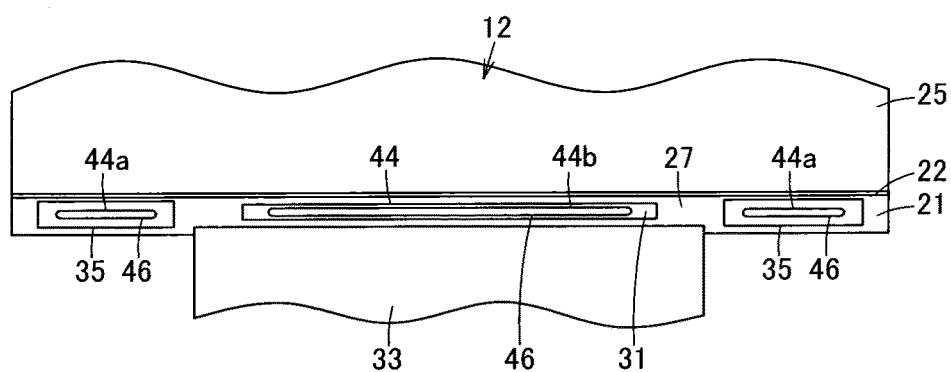
FIG. 4 is a plan view schematically showing an application pattern of adhesive forming a secondary bonding portion of a display device according to a second embodiment.

It is noted that in the first embodiment above, each secondary bonding portion 44 may be formed through curing of, for example, an applied (straight) line of the adhesive 46 as in the second embodiment shown in FIG. 4. That is, the secondary bonding portion 44 is each formed on the spacer 35 and the driver 31 in a straight line continuing along the lateral direction of the liquid crystal panel 12, and the first secondary bonding portion 44a positioned on each spacer 35 and the second secondary bonding portion 44b positioned on the driver 31 are spaced from each other. In this case, each secondary bonding portion 44 desirably has a ratio ((line width)/(gap)) of a predetermined value or less (e.g. 15 or less) between the line width in a plan view and the gap between the non-opposed portion 27 side (the spacer 35 part and the driver 31 part) and the touch panel 13 side (the sensor portion 38 and the protector cover 39) at the position of the secondary bonding portion 44. In this embodiment, since the gap between the non-opposed portion 27 side (the spacer 35 part and the driver 31 part), on which the secondary bonding portion 44 is provided, and the touch panel 13 side (the sensor portion 38) is set to, for example, about 100 μm (0.1 mm), the secondary bonding portion 44 desirably has a line width of 1.5 mm or less, respectively.

Forming the secondary bonding portion 44 through curing of the adhesive 46 thus applied in a line then allows the non-opposed portion 27 side and the touch panel 13 side to be bonded together more firmly and the adhesive 46 to be applied more easily.

In addition, the secondary bonding portions 44 are set away from each other and, even if the secondary bonding portions 44 may thermally expand under high temperature, for example, can expand into an ensured horizontal space, so that the gap between the substrates 21 and 22 is less likely to change and yellow unevenness (yellowing unevenness) due to such a change would be less likely to occur within the display area 29, whereby it is possible to prevent the display quality from decreasing.

Figure 5:
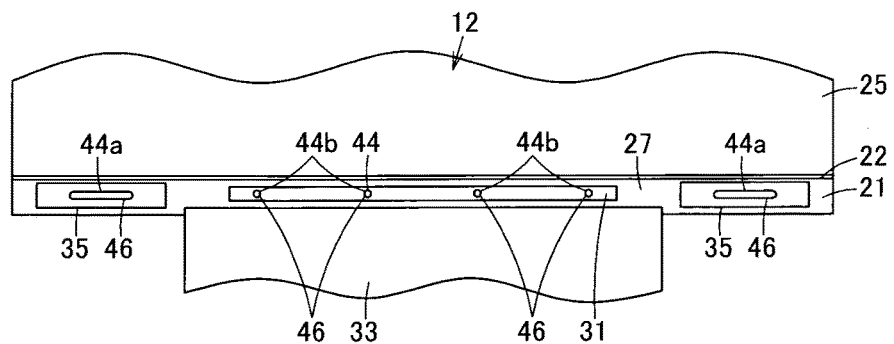
FIG. 5 is a plan view schematically showing an application pattern of adhesive forming a secondary bonding portion of a display device according to a third embodiment.

Further, as in the third embodiment shown in FIG. 5, the first embodiment and the second embodiment above may be combined to form the secondary bonding portion 44 through curing of applied points and line of the adhesive 46. In this case, the first secondary bonding portion 44a positioned on the array substrate 21 in the non-opposed portion 27 is formed in a line, while the second secondary bonding portion 44b positioned on the driver 31 in the non-opposed portion 27 is formed in points, for example.

In accordance with at least one of the above-described embodiments, all the secondary bonding portions 44, which are formed on the driver 31 and the spacer 35, which has approximately the same thickness as that of the driver 31, can be formed to have approximately the same thickness, so that the time for curing of the adhesive 46, for example, can be controlled more easily, and the strength of the secondary bonding portions 44 as well as the gap between the substrates 21 and 22 are less likely to suffer from unevenness.

Figure 6:
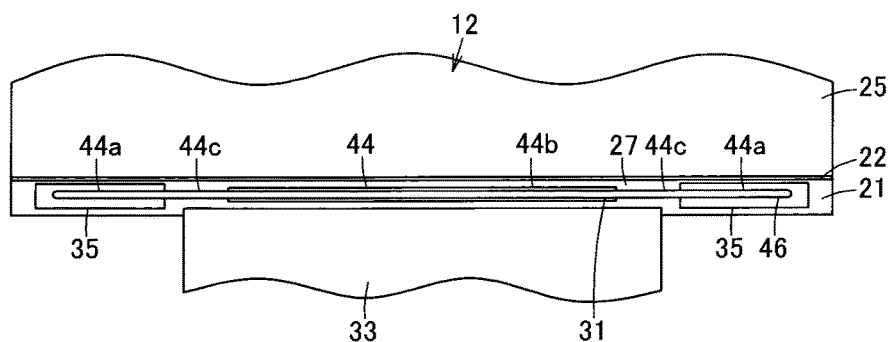
FIG. 6 is a plan view schematically showing an application pattern of adhesive forming a secondary bonding portion of a display device according to a fourth embodiment.

Further, as in the fourth embodiment shown in FIG. 6, the secondary bonding portion 44 may be formed through curing of an applied straight line of the adhesive 46. That is, the secondary bonding portion 44 may be formed such that across the respective spacers 35, the driver 31, and the array substrate 21 between the spacer 35 and the driver 31, the first secondary bonding portion 44a positioned on the spacer 35, the third secondary bonding portion 44c positioned on the array substrate 21, and the second secondary bonding portion 44b positioned on the driver 31 continue in a straight line. Even if the height of the non-opposed portion 27 side may thus be stepwise, the adhesive 46 is deformed to easily follow the step, whereby it is possible to reliably bond together the non-opposed portion 27 side and the touch panel 13 side.

Figure 7:
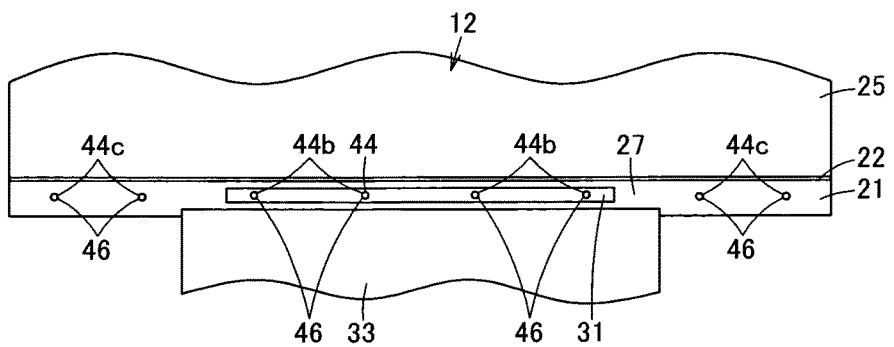
FIG. 7 is a plan view schematically showing an application pattern of adhesive forming a secondary bonding portion of a display device according to a fifth embodiment.
Figure 8:
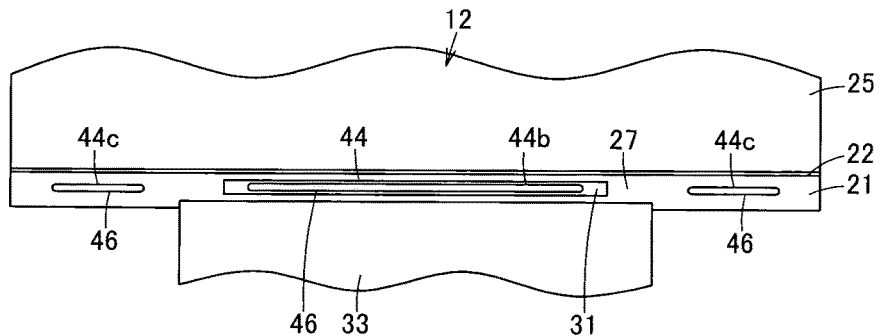
FIG. 8 is a plan view schematically showing an application pattern of adhesive forming a secondary bonding portion of a display device according to a sixth embodiment.
Figure 9:
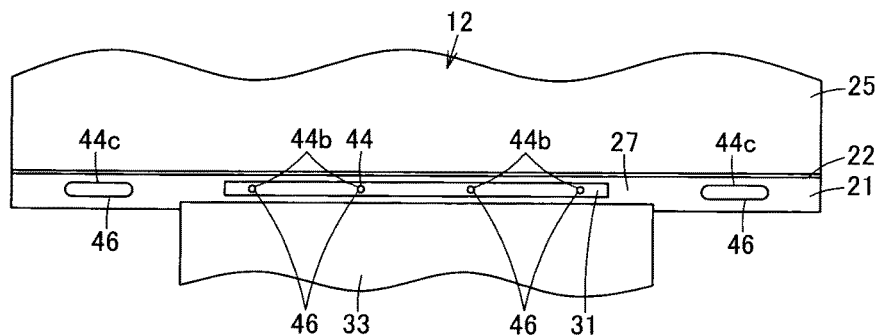
FIG. 9 is a plan view schematically showing an application pattern of adhesive forming a secondary bonding portion of a display device according to a seventh embodiment.
Figure 10:
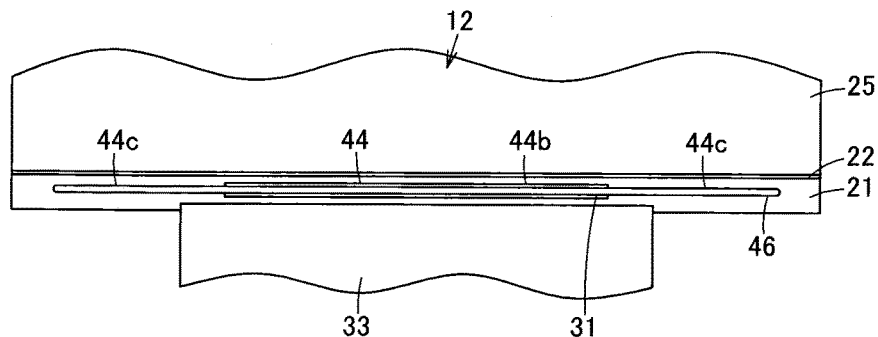
FIG. 10 is a plan view schematically showing an application pattern of adhesive forming a secondary bonding portion of a display device according to an eighth embodiment.

Also, in the first to fourth embodiments above, no spacer may be used on each non-opposed portion 27 as in the fifth embodiment shown in FIG. 7, the sixth embodiment shown in FIG. 8, the seventh embodiment shown in FIG. 9, and the eighth embodiment shown in FIG. 10. In these cases, there is no need to include a step of bonding a spacer, resulting in a further manufacturability improvement and, even if no spacer may be provided, the adhesive 46 is deformed to easily follow the step and the like, whereby it is possible to reliably bond together the non-opposed portion 27 side and the touch panel 13 side.

In accordance with at least one of the above-described embodiments, the primary bonding portion 43 is composed of translucent synthetic resin 45 and provided to cover at least the display area 29 and bond together the counter substrate 22 side and the touch panel 13 side, while the secondary bonding portion 44 is formed in a columnar shape through curing of adhesive 46 being ultraviolet curable liquid resin with a viscosity higher than that of resin of the primary bonding portion 43 to bond together the non-opposed portion 27 side of the liquid crystal panel 12 and the touch panel 13 side. Accordingly, compared to the case of using adhesive or the like with lower viscosity, there is no need to take into account the flow of the adhesive 46 during formation of the secondary bonding portion 44, and not only can the layout be created freely but also even a complex step, for example, can be correspondingly followed through deformation, so that the amount of use of the adhesive 46 can be reduced and also controlled easily, for example, resulting in a manufacturability improvement. In addition, even when the portion of the array substrate 21 extending from the counter substrate 22 may be applied with a force from the back side of the non-opposed portion 27, the secondary bonding portion 44 can prevent the array substrate 21 from undergoing a deflection at the position of the non-opposed portion 27. Further, the secondary bonding portion 44, which is composed of UV curable resin, has good temperature characteristics so as to undergo a smaller amount of thermal expansion under circumstances of both room temperature and high temperature, whereby the gap between the array substrate 21 and the counter substrate 22 can be made less likely to change due to an external force and/or a temperature change. It is therefore possible to make yellow unevenness (yellowing unevenness) due to such a change in the gap less likely to occur within the display area 29 and thereby to prevent the display quality from decreasing.

In addition, the primary bonding portion 43 is only required to be formed to cover the display area 29 (the polarizing plate 25). Accordingly, compared to the case of extending the portion to the non-opposed portion 27 to fill the gap, there is no need to f finely adjust the amount and position of application of the synthetic resin 45, resulting in a further manufacturability improvement.

That is, the gap between the non-opposed portion 27 side and the touch panel 13 side is not filled, but the secondary bonding portion 44 is only formed in a columnar shape in the non-opposed portion 27, which can provide the display device 11 with an improved manufacturability and which is capable of preventing a decrease in the display quality.

Moreover, the secondary bonding portion 44 also bonds together the part from the other end face 38a of the sensor portion 38 of the touch panel 13 to the protector cover 39, which allows the non-opposed portion 27 side and the touch panel 13 side to be bonded together more firmly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a display device main body configured to display an image thereon;
    a transparent touch panel including a sensor portion and a protector cover; and
    a bonding portion bonding the display device main body and the touch panel to each other, wherein
    the display device main body comprises:
        a first substrate;
        a second substrate disposed with a predetermined clearance maintained with respect to the first substrate in a manner opposed to a portion of the first substrate, the second substrate arranged to form with the first substrate a display area therebetween capable of displaying an image therein;
        a peripheral portion provided at a position of the first substrate not opposed to the second substrate, and
        a driver mounted on the peripheral portion and electrically connected with the display area, and wherein
    the bonding portion comprises:
        a primary bonding portion composed of translucent synthetic resin and bonding together the second substrate side and the sensor portion in a manner covering at least the display area; and
        a secondary bonding portion provided in a columnar shape through curing of adhesive being ultraviolet curable liquid resin with a viscosity higher than that of the synthetic resin of the primary bonding portion, the secondary bonding portion being disposed on the driver and bonding together the peripheral portion side and a side surface of the sensor portion and the protector cover, wherein
    the primary bonding portion is thinner than the secondary bonding portion in film thickness, and
    the secondary bonding portion is positioned separated away from the primary bonding portion.

2. The display device according to claim 1, wherein the secondary bonding portion is provided through curing of at least one point applied of the adhesive.

3. The display device according to claim 1, wherein the secondary bonding portion is provided through curing of at least one line applied of the adhesive.

4. The display device according to claim 1, wherein
    the display device main body comprises a spacer disposed on the peripheral portion outside of the driver, and wherein
    one or more secondary bonding portions are disposed on the driver and the spacer.

5. The display device according to claim 1, wherein the display device main body is a liquid crystal panel.

* * * * *